(12) United States Patent
Vicknair et al.

(10) Patent No.: US 7,483,938 B2
(45) Date of Patent: Jan. 27, 2009

(54) SYSTEM FOR CHARACTER VALIDATION AND METHOD THEREFOR

(75) Inventors: Wayne Elmo Vicknair, Austin, TX (US); Stewart E. Nickolas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1369 days.

(21) Appl. No.: 09/965,014

(22) Filed: Sep. 27, 2001

(65) Prior Publication Data

US 2003/0061343 A1    Mar. 27, 2003

(51) Int. Cl.
*G06F 15/16* (2006.01)
*G06F 9/45* (2006.01)

(52) U.S. Cl. .................. 709/200; 717/143

(58) Field of Classification Search ......... 719/328–331; 715/500, 513; 709/217–219, 230–231, 224; 704/9; 714/747; 717/143

See application file for complete search history.

(56) References Cited

U.S. PATENT DOCUMENTS

| | | | | |
|---|---|---|---|---|
| 5,223,831 A * | 6/1993 | Kung et al. | ............... | 340/7.56 |
| 5,226,148 A | 7/1993 | Littlewood | ................. | 395/575 |
| 5,309,358 A | 5/1994 | Andrews et al. | ....... | 364/419.01 |
| 5,495,577 A * | 2/1996 | Davis et al. | ................. | 715/542 |
| 5,793,381 A | 8/1998 | Edberg et al. | ............... | 345/467 |
| 5,916,305 A * | 6/1999 | Sikdar et al. | ................. | 709/236 |
| 6,003,050 A | 12/1999 | Silver et al. | ................. | 707/536 |
| 6,032,165 A | 2/2000 | Andrews et al. | ............ | 707/536 |
| 6,049,869 A | 4/2000 | Pickhardt et al. | ............ | 712/300 |
| 6,182,029 B1 | 1/2001 | Friedman | ........................ | 704/9 |
| 6,204,782 B1 | 3/2001 | Gonzalez et al. | ............... | 341/90 |
| 6,405,191 B1 * | 6/2002 | Bhatt et al. | .................... | 707/3 |
| 6,631,501 B1 * | 10/2003 | Jurion et al. | ................ | 715/535 |
| 6,968,395 B1 * | 11/2005 | Lee | ............................. | 709/246 |
| 7,120,642 B2 * | 10/2006 | Hsu et al. | ................... | 707/102 |
| 7,197,769 B2 * | 3/2007 | Howard et al. | ................ | 726/23 |
| 2002/0038320 A1 * | 3/2002 | Brook | ........................ | 707/513 |
| 2002/0042707 A1 * | 4/2002 | Zhao et al. | ..................... | 704/9 |
| 2002/0044662 A1 * | 4/2002 | Sowler | ....................... | 380/277 |
| 2002/0091850 A1 * | 7/2002 | Perholtz et al. | ............. | 709/231 |
| 2002/0143521 A1 * | 10/2002 | Call | ............................. | 704/1 |
| 2005/0246694 A1 * | 11/2005 | Soderberg et al. | ........... | 717/143 |

* cited by examiner

*Primary Examiner*—Andrew Caldwell
*Assistant Examiner*—Benjamin Ailes
(74) *Attorney, Agent, or Firm*—Duke W. Yee; Jeffrey S. LaBaw; Gerald H. Glanzman

(57) ABSTRACT

A circular VTOL aircraft with a central vertically mounted turboprop engine 14, driving contra-rotating co-axial propellers 24, above a central jet engine (or engines) 12, horizontally mounted on a turntable pod 11 which is steerable through 360 degrees. The turboprop provides vertical thrust from contra-rotating propellers compressing air from an upper circular intake 5 downward through a circular shaped rotor-chamber 6 to a circular vent 10 at the base of the craft. The resulting column of compressed air supports the craft during take-off and landing operations and provides a cushion of air in normal flight. The horizontally mounted jet turbine provides main thrust for horizontal flight and vectored thrust for VTOL. The passenger cabin 21 is circular and is situated in the main body of the disc-shaped craft. Fuel tanks are situated around the circumference of the craft to maximise fuel capacity. The flight-deck 2 is situated at the top centre of the craft, above the engine unit 15, which is detachable.

10 Claims, 4 Drawing Sheets

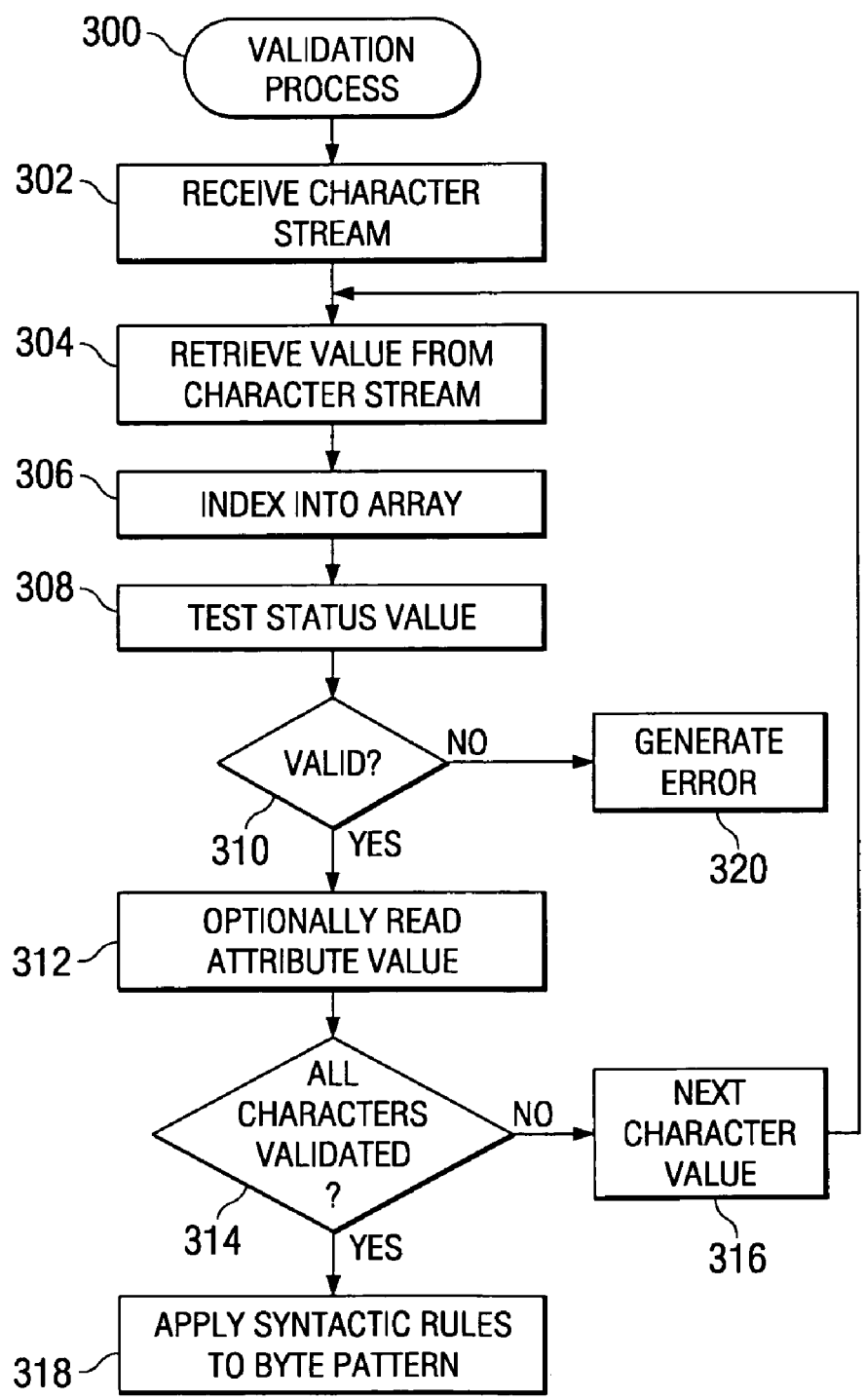

FIG. 4

| | 404 | 406 | 408 | 410 | 412 | 414 |
|---|---|---|---|---|---|---|
| | $0_x0000$ | "0" | "0" | "0" | "0" | "0" |
| | ⋮ | ⋮ | ⋮ | ⋮ | ⋮ | ⋮ |
| | $0_x0009$ | "0" | "0" | "0" | "0" | "0" |
| | $0_x000A$ | "0" | "0" | "0" | "0" | "0" |
| | ⋮ | ⋮ | ⋮ | ⋮ | ⋮ | ⋮ |
| | $0_x0020$ | "0" | "0" | "0" | "0" | "0" |
| | ⋮ | ⋮ | ⋮ | ⋮ | ⋮ | ⋮ |
| | $0_x0030$ | "0" | "1" | "0" | "0" | "0" |
| | ⋮ | ⋮ | ⋮ | ⋮ | ⋮ | ⋮ |
| POINTER 402 → | $0_x0041$ | "1" | "0" | "0" | "0" | "0" |
| | $0_x0042$ | "1" | "0" | "0" | "0" | "0" |
| | ⋮ | ⋮ | ⋮ | ⋮ | ⋮ | ⋮ |
| | $0_x00B7$ | "0" | "0" | "1" | "0" | "0" |
| | ⋮ | ⋮ | ⋮ | ⋮ | ⋮ | ⋮ |
| | $0_x0300$ | "0" | "0" | "0" | "1" | "0" |
| | ⋮ | ⋮ | ⋮ | ⋮ | ⋮ | ⋮ |
| | $0_x4E00$ | "0" | "0" | "0" | "0" | "1" |
| | ⋮ | ⋮ | ⋮ | ⋮ | ⋮ | ⋮ |
| | $0_xD7FF$ | "1" | "0" | "0" | "0" | "0" |
| | $0_xD800$ | "0" | "0" | "0" | "0" | "0" |
| | $0_xD801$ | "0" | "0" | "0" | "0" | "0" |
| | ⋮ | ⋮ | ⋮ | ⋮ | ⋮ | ⋮ |
| | $0_xE000$ | "0" | "0" | "0" | "1" | "0" |
| | ⋮ | ⋮ | ⋮ | ⋮ | ⋮ | ⋮ |
| | $0_xFFFD$ | "0" | "1" | "0" | "0" | "0" |
| | $0_xFFFE$ | "0" | "0" | "0" | "0" | "0" |
| | $2^n-1s$ $0_xFFFF$ | "0" | "0" | "0" | "0" | "0" |

← 400

SYSTEM FOR CHARACTER VALIDATION AND METHOD THEREFOR

TECHNICAL FIELD

The present invention relates in general to data processing systems, and in particular to parsing markup language character streams constituting client-server messages in a distributed data processing environment.

BACKGROUND INFORMATION

The development of computerized distribution information systems, such as the Internet, allows users to link with servers and networks, and thus retrieve vast amounts of electronic information that was previously unavailable using conventional electronic media.

Users may be linked to the Internet through a hypertext based service commonly referred to as the World Wide Web (WWW). (The WWW may also be used in a broader sense to refer to the whole constellation of resources that can be accessed using one or more of the protocols that embody the TCP/IP suite, described further below.) With the World Wide Web, an entity may register a "domain name" correlated with an electronic address (referred to an IP address) representing a logical node on the Internet and may create a "web page" or "page" that can provide information and some degree of interactivity.

The Internet is based upon a suite of communication protocols known as Transmission Control Protocol/Internet Protocol (TCP/IP) which sends packets of data between a host machine, such as a server computer on the Internet commonly referred to as web server, and a client machine, such as user's computer connected to the Internet. The WWW communications may typically use the Hypertext Transfer Protocol (HTTP) which is supported by the TCP/IP transmission protocols, however, file transfer and other services via the WWW may use other communication protocols, for example the File Transfer Protocol (FTP).

A computer user may "browse", i.e., navigate around, the WWW by utilizing a suitable web browser, e.g., Netscape™, Internet Explorer™, and a network gateway, e.g., Internet Service Provider (ISP). A web browser allows the user to specify or search for a web page on the WWW and subsequently retrieve and display web pages on the user's computer screen. Such web browsers are typically installed on personal computers or workstations to provide web client services, but increasingly may be found on other wired devices, for example personal digital assistants (PDA) or wireless devices such as cell phones.

As noted above, transactions between Web client and server may be dynamic and may be interactive. A user of a Web client may, for example, request information from the Web server, such as, by way of example, a stock quotation (which is typically dynamic, that is changes over time), or product information (which may be static information maintained in a database by the provider of the Web server). The request message may be communicated to the server in accordance with HTTP, and may additionally, be encapsulated in accordance with an information exchange protocol. One such open-architecture protocol is the Simple Object Access Protocol (SOAP), which is a protocol for the exchange of information in a distributed environment. (A specification for SOAP 1.1 may be found in World Wide Web Consortium (W3C) Note 8 May 2000, copyright 2000, which is hereby incorporated herein by reference.) SOAP is an eXtensible Markup Language (XML) based protocol, whereby the SOAP message may be encoded using XML. (A markup language is a mechanism to identify structures in a document, and an extensible markup language constitutes a meta-language for defining particular markup languages. XML is a particular extensible markup language, having, as recognized by those in the art, an open specification. Another example is the Standard Generalized Markup Language (SGML). Another, non-extensible, markup language is the Hyptertext Markup Language (HTML).) Note that a request message may include a remote procedure call (RPC) whereby a server-side application procedure may be invoked to service the request. That is, the message may be an interapplication communication. SOAP messages may be carried in HTTP, that is, may be embedded in an HTTP request. Hence, the SOAP provides a mechanism for carrying RPCs via HTTP. The response to the request may be returned to the client via an HTTP response carrying a SOAP message encapsulating the response encoded as an XML text stream.

Thus, transactions between a client and server may include a sequence of messages each of which may constitute a stream of characters in which the characters are defined in accordance with a markup language specification. Each character stream may be parsed into elements constituting the message in accordance with the message encapsulation protocol, such as the SOAP. The parser determines if the characters in the stream are valid characters as defined in the markup language specification. Each character may be represented in accordance with the markup language specification by an n-bit value, however not all n-bit values need necessarily represent a character within the specification of a particular markup language. For example, in XML, characters are represented by sixteen-bit values, however, not all such values correspond to valid characters in the XML specification. Typically, parsers validate characters by applying a set of "IF-THEN" rules. However, applying such a rule set, which may be complex, to validate each character may consume significant data processing resources. Consequently, there is a need in the art for systems and methods for parsing character streams that reduce the consumption of processor resources, particularly processing cycles.

SUMMARY OF THE INVENTION

The aforementioned needs are addressed by the present invention. Accordingly, there are provided character validation systems and methods. These include circuitry and steps, respectively, for retrieving a data value from a character stream. A validity of the character represented by the value retrieved from the stream is determined in response to a member of a data structure corresponding to the value, wherein each member of the data structure includes validity information for a corresponding data value.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates, in flow chart form, a methodology in accordance with an embodiment of the present invention;

FIG. 4 illustrates in tabular form, an data structure which may be used in conjunction with the methodology of FIG. 3.

DETAILED DESCRIPTION

Figure 1:
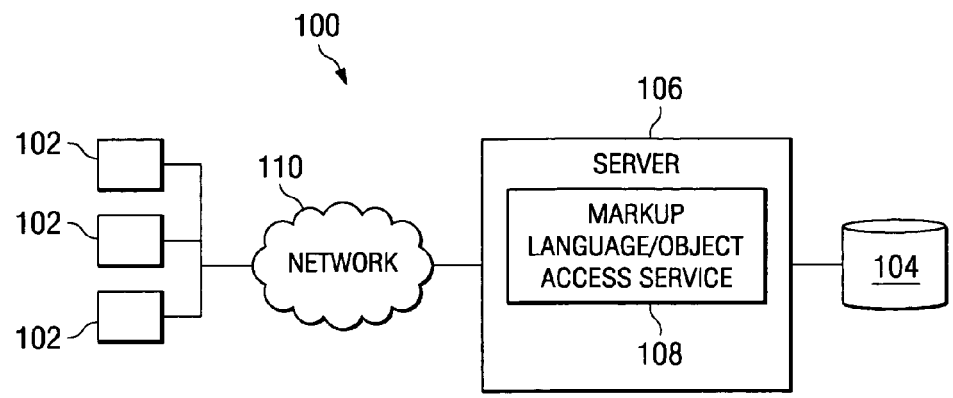
FIG. 1 illustrates, in block diagram form, a client-server environment which may be used in conjunction with the present invention.

In the following description, numerous specific details are set forth to provide a thorough understanding of the present invention. For example, character representations may be identified in accordance with and markup language specifications and operations may be described in conjunction with particular protocols, however it would be recognized by those of ordinary skill in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Referring to FIG. 1 there is illustrated a Web client-server system 100, in accordance with the principles of the present invention. System 100 includes one or more clients 102. Access to Web page data 104 is mediated via server 106 which includes markup language/object access service 108 in accordance with the principles of the present invention. Clients 102 may be coupled to server 106 via network 110, may be a local machine or via a network which may be a local area network (LAN), wide area network (WAN), or the Internet.

Figure 2:
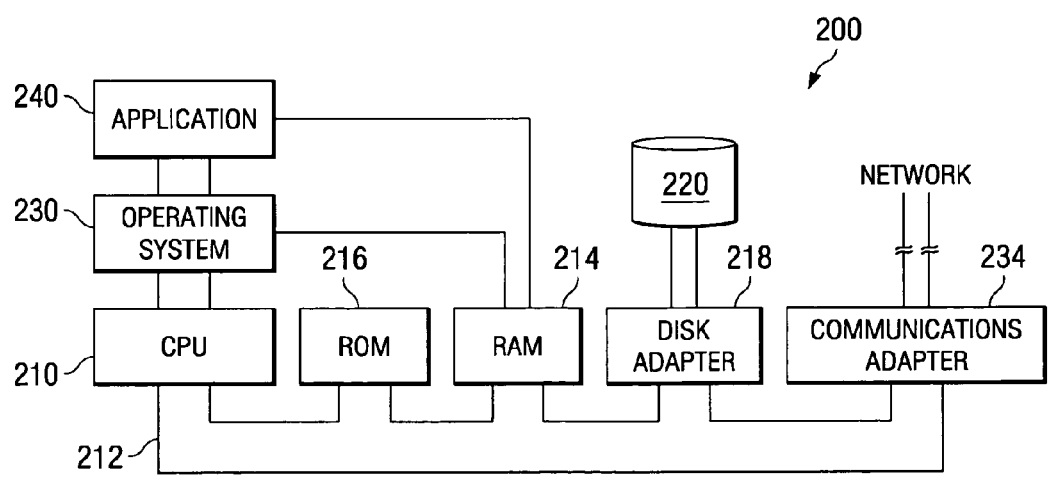
FIG. 2 illustrates, in block diagram form, a data processing system in accordance with an embodiment of the present invention.

Refer now to FIG. 2 which illustrates a data processing system 200 in accordance with the principles of the present invention. System 200 may be used in an embodiment of a client(s) 102 and server 106. System 200 may include a central processing unit (CPU) 210 coupled to various other components by system bus 212. An operating system 230 runs on CPU 210 and provides control and coordinates the function of the various components in FIG. 2. Application 240 includes instructions for parsing markup language character streams including instructions for validating characters therein in accordance with the principles of the present invention, and which will be described further in conjunction further with FIGS. 3 and 4 hereinbelow. It would be appreciated by those of ordinary skill in the art that the operations performed by the instructions for parsing character streams would be similar in a client-side embodiment of system 200 and a server-side embodiment of system 200. Application 240 runs in conjunction with operating system 230, which coordinates the internal functions of server 106, as would be understood by those of ordinary skill in the art. Additionally, read only memory (ROM) 216 is coupled to system bus 212 and includes a basic input/output system (BIOS) that control certain basic functions of data processing system 200. Random access memory (RAM) 214, disk adapter 218 and communications adapter 234 are also coupled to system bus 212. It should be noted that software components including operating system 230 and application 240 are loaded into RAM 214 which is the computer systems main memory. Disk adapter 218 may be a Universal Serial Bus (USB) or other adapter that communicates with disk units 220. It is noted that the program of the present invention may reside in disk unit 220 and loaded into RAM 214 by operating system 230, as required. Communications adapter 234 interconnect interconnects bus 212 with a network, such as network 110, FIG. 1.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by server 106, the set of instructions may be stored as a computer program product in another computer memory, for example in disk drive 220 (which may include a removable memory such as an optical disk or floppy disk for eventual use in disk drive 220). Furthermore, the computer program product can also be stored in another computer and transmitted when desired to the work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Refer now to FIG. 3 illustrating, in flowchart form, character validation process 300. In step 302, a character stream is received. The received character stream may be associated with a file constituting a message in accordance with a markup language such as XML, as previously described. Additionally, as discussed hereinabove, the message may be packaged in accordance with the SOAP.

In step 304, a value from the stream is retrieved. Note that each character in the stream constituting a message formatted in accordance with a defined markup language may have a representation as a hexadecimal value. In general, the representation of characters in the markup language may include a number, n, of bits, and such a representation my be used in conjunction with the present invention, as would be appreciated by those of ordinary skill in the art. Recall, however, that not each hexadecimal (generally, n-bit) value necessarily corresponds to a valid character.

In step 306, the hexadecimal value (or, generally, the n-bit value) corresponding to the character retrieved from the stream in step 304 is used as a pointer, or index into an array, or similar data structure. The array or similar data structure includes m entries, where $m=2^n$. Thus, for a character representation by hexadecimal digits, the table may include 65536 entries. Each entry includes a field containing a validity value. An exemplary array 400 is illustrated in FIG. 4. Array 400 may embody character representations in accordance with the XML 1.0 Specification (Second Edition), W3C Recommendation 6 Oct. 2000, which is hereby incorporated herein by reference. However, it would be understood by ordinarily skilled artisans that other character representations as defined in a specification for other markup languages may be used in an embodiment of array 400 in accordance with the present inventive principles. (A process for generating such an array, or similar data structure will be discussed in conjunction with FIG. 5.)

Pointer 402 indexes into array 400 and selects, in response to an n-bit character representation a corresponding entry in the array. In column 404, are illustrated hexadecimal values spanning the range $[0, 2^n-1]$. Column 406 contains the base character status value for the corresponding entries in array 400. A Boolean TRUE, represented by the value "1" in column 406 of array 400 denotes that the character represented by the corresponding pointer is a base character. A Boolean FALSE, represented by the value "0" in column 406, indicates that the character represented by the corresponding value is not a base character (but may be another character class). Additionally, each entry may include additional fields associated with valid character attributes. For example, in XML, other character classes include a digit character, a combining character class, and extender character class and an ideograph character class. Thus, in an array 400 in accordance with the XML 1.0 Specification, entry fields in columns 406-414 may include a Boolean status value denoting a status, or attribute, associated with each valid character. Thus in array 400, the values 0x0041 and 0x0042 represent valid base characters. (Hexadecimal values are denoted herein with the prefix 0x.) Similarly, column 408 may contain Boolean values denoting the digit character class attribute, column 410 the extender character class attribute, column 412 the combining character class attribute and 414 the ideograph character class attribute. In array 400, the value 0x0030 represents a valid digit character, the value 0x00B7 a valid extender character, the value 0x0300 a valid combining character and the value 0x4E00 represents a valid ideograph character. In this way, the validity of a data value as a valid representation of a character may be determined by reference to the status values in columns 406-414 for the entry in array 400 corresponding to the data value. If all the status values are FALSE, then the data value does not correspond to a valid character. Thus, for example, in array 400, the hexadecimal value 0x0000 does not represent a valid markup language character. Likewise, the values 0xD800, 0xD801, 0xFFFE and 0xFFFF illustrated in array 400 are invalid. Conversely, the values 0xD7FF, 0x0E00 and 0xFFFD, for example, represent valid characters. However, it would be recognized by those of ordinary skill in the art that in other embodiments of array 400 in accordance with other markup languages, the values 0x0000, 0xD800, 0xD801, 0xFFFE and 0xFFFF may be valid and other hexadecimal (generally, n-bit) values may be invalid. Additionally, within the XML Specification, an alternative embodiment of array 400 may reference the letter character class in which valid characters having this attribute would be represent by the logical union of columns 406 and 414.

Returning to FIG. 3, in step 308, a validity value is tested. In an embodiment of the present invention in accordance with an array 400, FIG. 4, the validity value may be a logical combination of status values. For example, in such an embodiment, the logical OR of the attribute values may be used. If, in step 310, the validity value denotes that the pointer value represents a valid character, is TRUE, or "1" then in step 312, the attribute values may, optionally, be read from the table. In step 314 it is determined if all characters in the stream have been similarly validated. If not, process 300 proceeds to the next character, step 316, and returns to step 304 to continue validating characters in the stream. Otherwise, all characters have been validated, in step 318, the syntactic rules for the markup language are applied to the character stream. In applying the syntactic rules in step 316, the attributes optionally retrieved in step 312, if any, may be used. For example, if the character is a combining character, the character may be, in accordance with XML, be associated with a namespace prefix.

Returning to step 310, if the validity value denotes that the pointer value represents an invalid character, for example, in an embodiment in accordance with array 400, FIG. 4, by determining that the value in column 406 of the entry pointed to in step 306 is FALSE, or "0" then, in step 320 an error response is generated. For example, a SOAP fault reply message may be sent, or a program exceptional condition may be raised.

Figure 5:
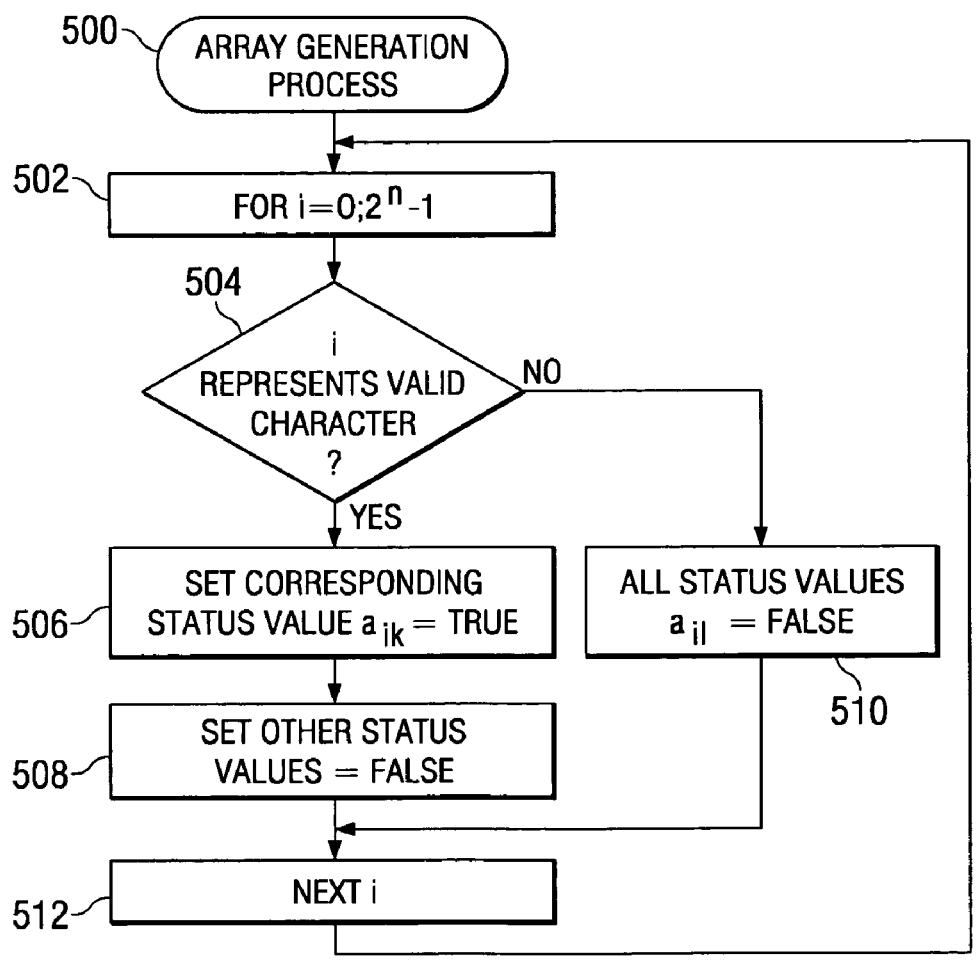
FIG. 5 illustrates, in flow chart form, a methodology for generating the data 15 structure of FIG. 4 in accordance with an embodiment of the present invention.

Refer now to FIG. 5, illustrating in flowchart form, a process 500 for generating an array which may be used in conjunction with a process for validating characters in a character stream in accordance with the present inventive principles. In an embodiment in which n-bit values represent characters, a loop with index, i, running from [0, $2^n-1$] is entered, in step 502.

If, in step 504, the value i represents a valid character in accordance with a markup language specification, then, in step 506, a status (equivalently, attribute) value $a_{ik}$ is set to a logically "TRUE" value, where the character represented by the value i has the kth attribute of a set of j attributes. In other words, each valid character belongs to at least one of a number, j, of character classes. In step 508, the remaining status values ($a_{il}$, l≠k) in accordance with the particular markup language specification are set to FALSE in the corresponding fields of the ith array entry.

If, however in step 504, the value i does not represent a valid character, in step 510, all status values $a_{il}$, l=1, . . . , j are set to a logically "FALSE" value. In step 512, process 500 proceeds to the next value of the index i and returns to step 502 to fill the array, or similar data structure entries. Note that, as would be understood by ordinarily skilled artisans, data structure pointers as used herein represent relative indices from the beginning of the data structure or array and absolute addresses may be generated by the operating system, which absolute addresses reflect the load address of the data structure in memory as well as the size of the array or data structure members.

Although the present invention and its advantages have been described in detail, it should be understood that various changes, substitutions and alterations can be made herein without departing from the spirit and scope of the invention as defined by the appended claims.

What is claimed is:

1. A computer-implemented character validation method comprising the steps of:

receiving a character stream, wherein characters in the character stream are defined in accordance with a given markup language specification;

retrieving a data value from the character stream; and determining whether a character represented by said data value is a valid character as defined in the given markup language specification, wherein determining whether said character represented by said data value is a valid character comprises:

locating a member of a data structure, said member having a direct correspondence to said retrieved data value, and determining whether said retrieved data value represents a valid character within the given markup language specification according to a logical combination of a plurality of status values in said located member of said data structure.

2. The computer-implemented method of claim 1 wherein said data structure comprises an array, and wherein locating the member of the data structure comprises:

indexing into said array using said retrieved data value; and pointing to said member in said array response to said indexing step.

3. The computer-implemented method of claim 1, wherein determining whether the retrieved data value represents a valid character within the given computer language according to a logical combination of a plurality of status values in said located member of said data structure, comprises determining whether the logical combination of the plurality of status values corresponds to a logically "TRUE" value, wherein, if the logical combination of the plurality of status values corresponds to a logically "TRUE" value, said data value represents a valid character.

4. The computer-implemented method of claim 1 further comprising the step of, if each character in said character stream is a valid character, applying a predetermined set of syntactic rules to byte patterns comprising said character stream.

5. The computer-implemented method of claim 4 wherein said given markup language comprises an extensible markup language.

6. The computer-implemented method of claim 5 wherein the extensible markup language comprises XML.

7. The computer-implemented method of claim 1 further comprising the step of generating said data structure.

8. The computer-implemented character validation method of claim 1 wherein characters in said character stream comprise characters defined in accordance with a specification for an extensible markup language, and wherein said plurality of status values comprises a first status value that indicates whether said data value represents a valid base character, a second status value that indicates whether said data value represents a valid digit character, and a third status value that indicates whether said data value is a valid extender character.

9. A character validation method comprising the steps of:
receiving a character stream, wherein characters in the character stream are defined in accordance with a given extensible markup language specification;
retrieving a data value from the character stream;
determining whether a character represented by said data value is a valid character as defined in the given extensible markup language specification, wherein determining whether said character represented by said data value is a valid character comprises:
locating a member of a data structure, said member having a direct correspondence to said retrieved data value, and
determining whether said retrieved data value represents a valid character within the given markup language specification according to a logical combination of a plurality of status values in said member of said data structure, wherein a first status value of said plurality of status values indicates whether said data value represents a valid character having a first attribute corresponding to said first status value, and wherein a second status value of said plurality of status values indicates whether said data value represents a valid character having a second attribute corresponding to said second status value; and
responsive to each character in said character stream being a valid character, applying a predetermined set of syntactic rules to byte patterns comprising said character stream in accordance with said extensible markup language.

10. The method of claim 9 wherein said character stream comprises a message packaged in accordance with the extensible markup language, and wherein said first status value indicates whether said data value is a valid base character, said second status value indicates whether said data value is a valid digit character, and a third status value indicates whether said data value is a valid extender character.

* * * * *